US012652631B2

(12) United States Patent
Yang et al.

(10) Patent No.: US 12,652,631 B2
(45) Date of Patent: Jun. 9, 2026

(54) SIDELINK COMMUNICATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jongkeun Park, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 639 days.

(21) Appl. No.: 18/025,316

(22) PCT Filed: Sep. 16, 2021

(86) PCT No.: PCT/KR2021/012715
§ 371 (c)(1),
(2) Date: Mar. 8, 2023

(87) PCT Pub. No.: WO2022/060130
PCT Pub. Date: Mar. 24, 2022

(65) Prior Publication Data
US 2023/0292266 A1 Sep. 14, 2023

(30) Foreign Application Priority Data
Sep. 18, 2020 (KR) ........................ 10-2020-0120190

(51) Int. Cl.
*H04W 56/00* (2009.01)
*H04W 16/28* (2009.01)

(52) U.S. Cl.
CPC ....... *H04W 56/0015* (2013.01); *H04W 16/28* (2013.01)

(58) Field of Classification Search
CPC .......................... H04W 56/0015; H04W 16/28
See application file for complete search history.

(56) References Cited

U.S. PATENT DOCUMENTS

2019/0045470 A1* 2/2019 Chervyakov ..... H04W 56/0015
2019/0230529 A1* 7/2019 Sadiq ...................... H04L 5/006

FOREIGN PATENT DOCUMENTS

KR 20200049889 A 5/2020

OTHER PUBLICATIONS

3GPP TSG RAN4 Meeting #87 R4-1806308 (Year: 2018).*
Intel Corporation, "On synchronization reference source selection/reselection for V2X sidelink CA," 3GPP TSG-RAN4 meeting #87, R4-1806308, 3 pages, May 2018.
Apple, "Rapporteur editorial CR in 38.133," 3GPP TSG-RAN4 Meeting #95e, R4-2009270, 23 pages, Jun. 2020.
(Continued)

*Primary Examiner* — Ricky Q Ngo
*Assistant Examiner* — Stephen N Steiner
(74) *Attorney, Agent, or Firm* — BRYAN CAVE LEIGHTON PAISNER LLP

(57) ABSTRACT
One disclosure of the present specification provides a method by which a UE performs sidelink communication. The method may comprise the steps of: transmitting an SL signal; and during a predefined detection time, on the basis of an SL synchronization signal (SLSS) transmitted from another UE, detecting another UE.

3 Claims, 13 Drawing Sheets

BS(e.g. eNB or gNB)

UE 1          UE 2

(56) References Cited

OTHER PUBLICATIONS

R1-1902597, 3GPP TSG RAN WG1 #96, Athens, Greece, Feb. 25-Mar. 1, 2019, Agenda Item: 7.2.4.1.3, Source: InterDigital Inc., Title: On Synchronization Mechanism and Procedures for NR V2X Sidelink, Document for: Discussion and Decision (10 pages).

R1-1909255, 3GPP TSG RAN WG1 #98, Prague, Czech, Aug. 26-30, 2019, Agenda Item: 7.2.4.3, Source: Qualcomm Incorporated, Title: Synchronization Design for NR V2X, Document for: Discussion/Decision (17 pages).

R2-2004901, 3GPP TSG-RAN WG2 Meeting #110-e, Electronic, Jun. 1-Jun. 12, 2020, Source: CATT, Title: [C402] Correction on (Re)Selection of Synchronisation; Reference Agenda Item: 6.4.2.1, Document for: Discussion and Decision (7 pages).

R4-1804800, 3GPP TSG-RAN WG4 Meeting #86bis, Melbourne, Australia, Apr. 16-20, 2018, Change Request, Current version: 15.2.0, Title: CR on Synchronization Reference Source Selection/Reselection Requirements for V2X CA, Source to WG: Huawei, HiSilicon, Source to TSG: R4, Work item code: LTE_eV2X-Core, Date: Apr. 6, 2018, Category: B, Release: Rel-15 (4 pages).

3GPP TS 38.331 V16.1.0 (Jul. 2020), Technical Specification, 3rd Generation Partnership Project; Technical Specification Group Radio Access Network; NR; Radio Resource Control (RRC) protocol specification, (Release 16) (906 pages).

Release 16, 3GPP TS 38.133 V16.3.0 (Mar. 2020) (214 pages).

* cited by examiner

Figure 3:
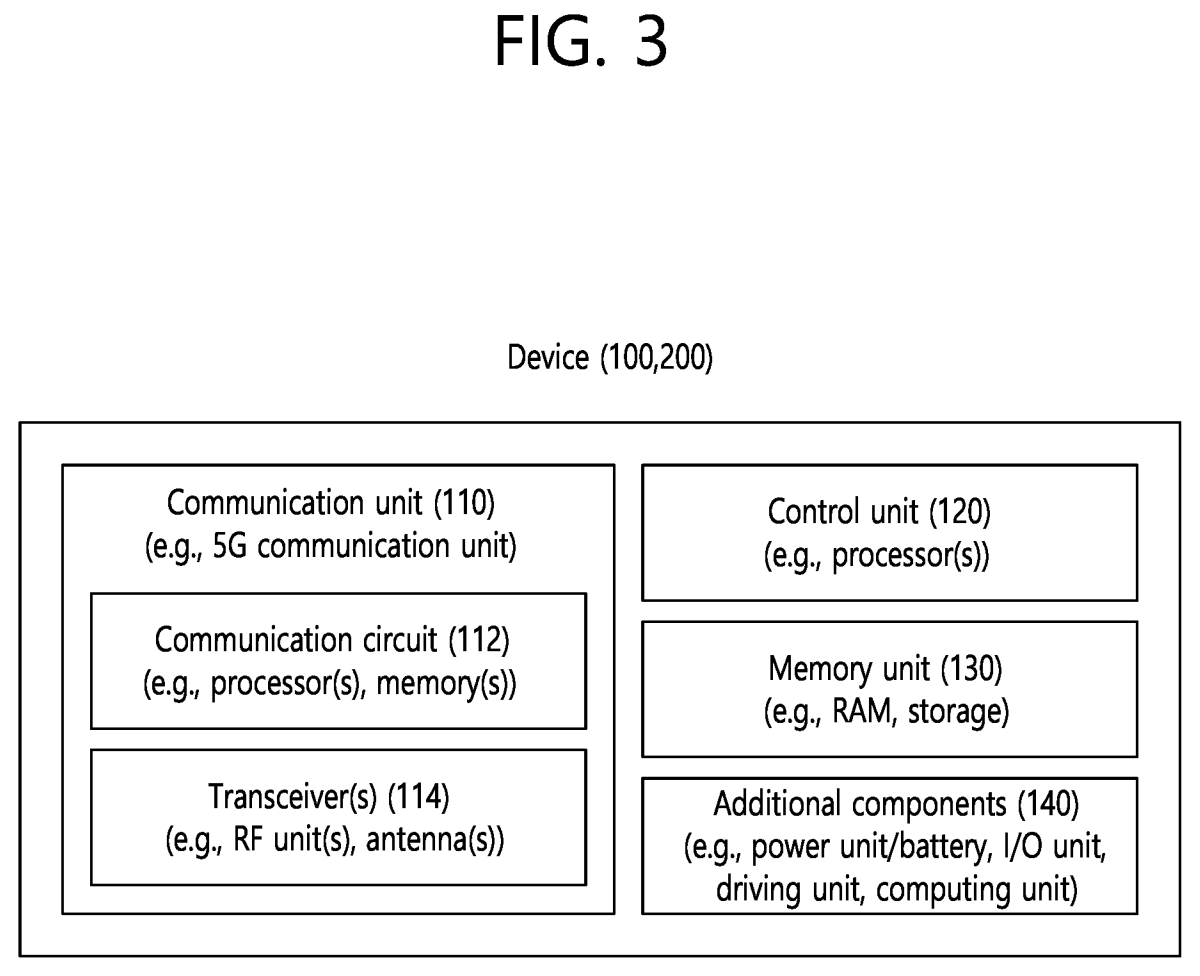

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 7
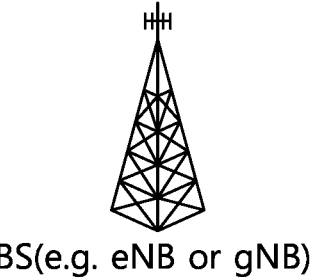
BS(e.g. eNB or gNB)
UE 1                                    UE 2

FIG. 10

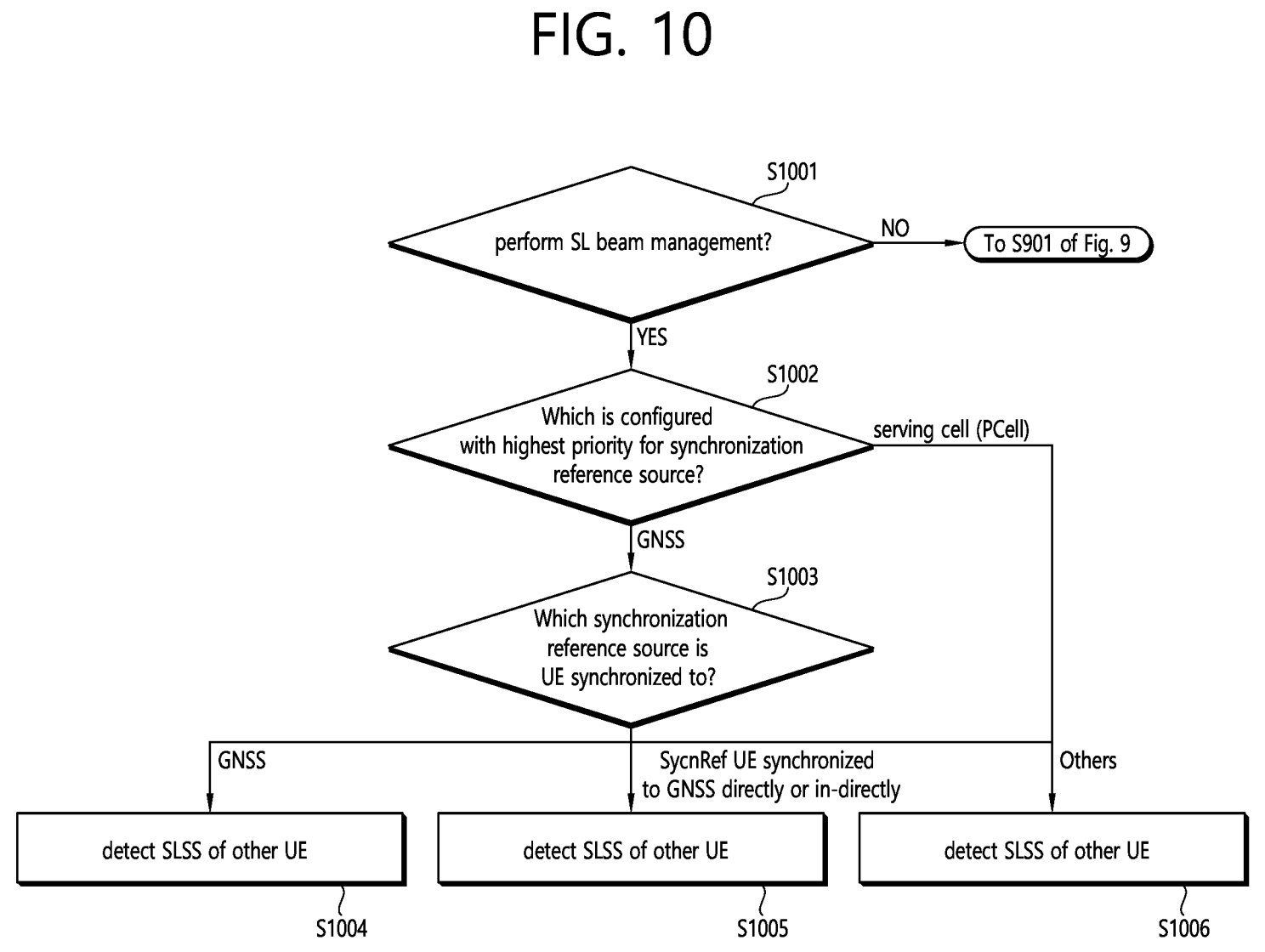

S1001 perform SL beam management?

NO → To S901 of Fig. 9

YES

S1002

Which is configured with highest priority for synchronization reference source?

serving cell (PCell)

GNSS

Others

S1003

Which synchronization reference source is UE synchronized to?

GNSS

SycnRef UE synchronized to GNSS directly or in-directly

S1004 detect SLSS of other UE

S1005 detect SLSS of other UE

S1006 detect SLSS of other UE

SIDELINK COMMUNICATION

CROSS-REFERENCE TO RELATED APPLICATIONS

This application is the National Stage filing under 35 U.S.C. 371 of International Application No. PCT/KR2021/012715, filed on Sep. 16, 2021, which claims the benefit of Korean Patent Application No. 10-2020-0120190 filed on Sep. 18, 2020, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) communication is a communication scheme in which a direct link is established between User Equipments (UEs), and the UEs exchange voice and data directly with each other without intervention of a base station (BS). SL communication is under consideration as a solution to the overhead of a BS caused by rapidly increasing data traffic.

An NR terminal performing SL communication must be able to select or reselect a synchronization reference source. Meanwhile, a terminal supporting Frequency Range 2 (1-R2) SL communication may perform a beam management operation. However, in the prior art, an operation related to selection or reselection of a synchronization reference source for a terminal supporting FR2 SL communication was not specifically defined. Due to this, there is a problem that the NR terminal cannot clearly or effectively perform SL communication.

SUMMARY

Accordingly, a disclosure of the present specification has been made in an effort to solve the aforementioned problem.

In order to solve the above problems, one disclosure of the present specification provides a method for a UE to perform sidelink communication. The method includes transmitting a SL signal; and detecting another UE based on a SL Synchronization Signal (SLSS) transmitted from the other UE during a predefined detection time.

In order to solve the above problems, one disclosure of the present specification provides a UE performing sidelink communication. The UE includes at least one transceiver; at least one processor; and at least one memory that stores instructions and is operatively electrically connectable with the at least one processor. The operations performed based on the instructions being executed by the at least one processor may include: transmitting the SL signal; and detecting another UE based on a SL Synchronization Signal (SLSS) transmitted from the other UE during a predefined detection time.

In order to solve the above problems, one disclosure of the present specification provides a device in mobile communication. The device includes at least one processor; and at least one memory that stores instructions and is operably electrically connectable with the at least one processor, wherein operations performed based on the instructions being executed by the at least one processor, may include: transmitting the SL signal; and detecting another UE based on a SL Synchronization Signal (SLSS) transmitted from the other UE during a predefined detection time.

In order to solve the above problems, one disclosure of the present specification provides a non-volatile (non-volatile) computer readable storage medium recording instructions. The instructions, when executed by one or more processors, cause the one or more processors to perform operations comprising: transmitting the SL signal; and detecting another UE based on a SL Synchronization Signal (SLSS) transmitted from the other UE during a predefined detection time.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure are applied.

FIG. 2 shows an example of wireless devices to which implementations of the present disclosure are applied.

FIG. 3 shows an example of a wireless device to which implementations of the present disclosure are applied.

FIG. 7 illustrates an example of a UE performing V2X or SL communication to which the implementation of the present disclosure is applied.

FIG. 10 shows an example of an operation of a terminal according to a second example of the disclosure of the present specification.

DETAILED DESCRIPTION

Figure 4:
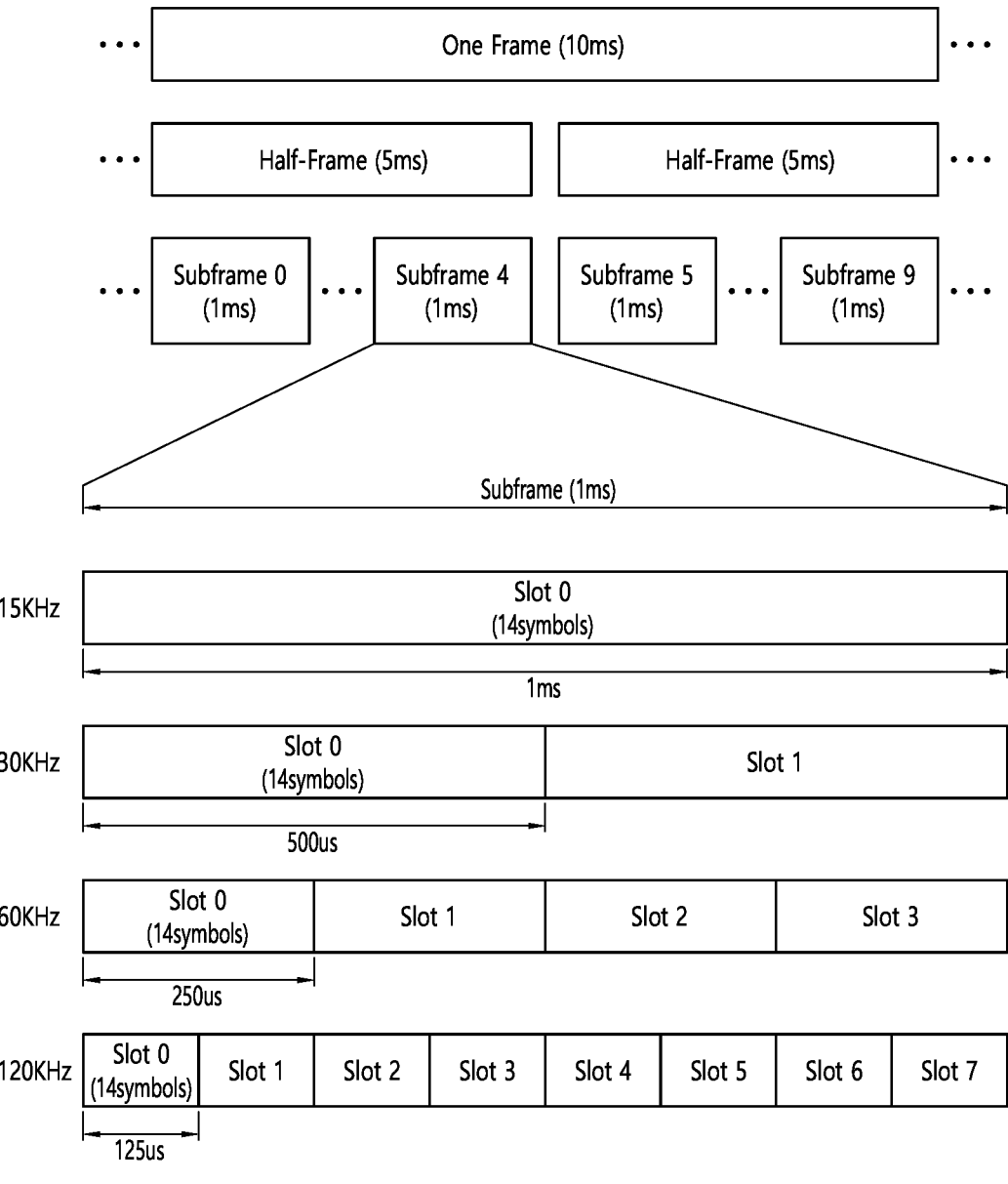
FIG. 4 illustrates an example of a structure of an NR system to which the implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs 01-DMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B".

Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, a User Equipment (UE) is shown in an exemplary manner, however, the shown UE may also be referred to as a term such as a Terminal, a Mobile Equipment (ME), and the like. Furthermore, the UE may be not only a portable device such as a notebook, a mobile phone, a PDA, a smart phone, a multimedia device, and the like, but also a non-portable device such as a PC and a vehicle mounted device.

Hereinafter, a UE is used as an example of a wireless communication device (or wireless apparatus or a wireless device) for which wireless communication is available. The operation performed by a UE may be performed by a wireless communication device. The wireless communication device may also be referred to as a wireless apparatus or a wireless device. Hereinafter, an AMF may mean an AMF node, an SMF may mean an SMF node, and a UPF may mean a UPF node.

The term, "base station" used below may be referred to as a fixed station that communicates with a wireless device, generally, and may also be called a different term such as an evolved-NodeB (eNodeB), an evolved-NodeB (eNB), a Base Transceiver System (BTS), an Access Point, a Next generation NodeB (gNB), and the like.

Figure 1:
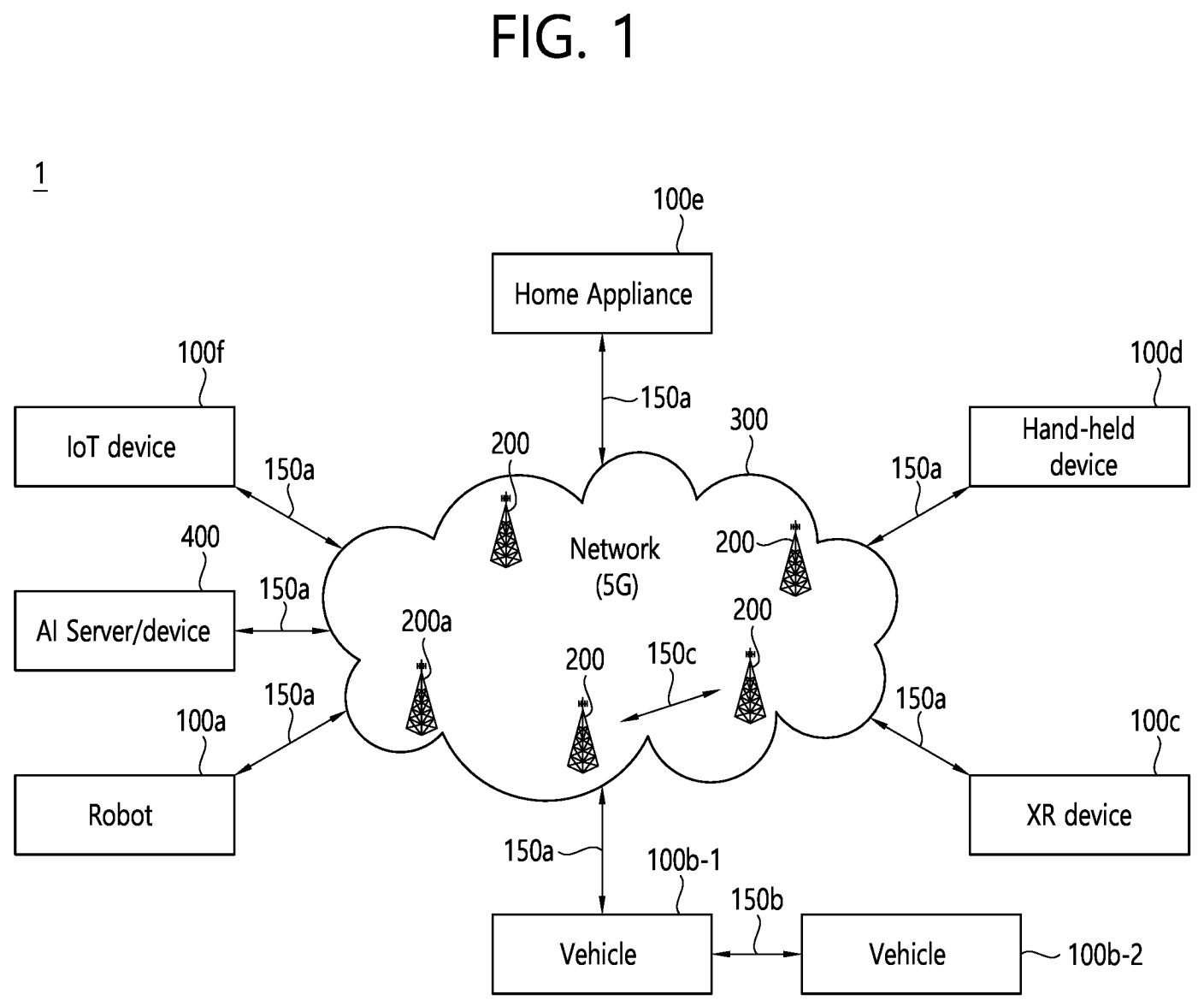

I. Technique and Procedure Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
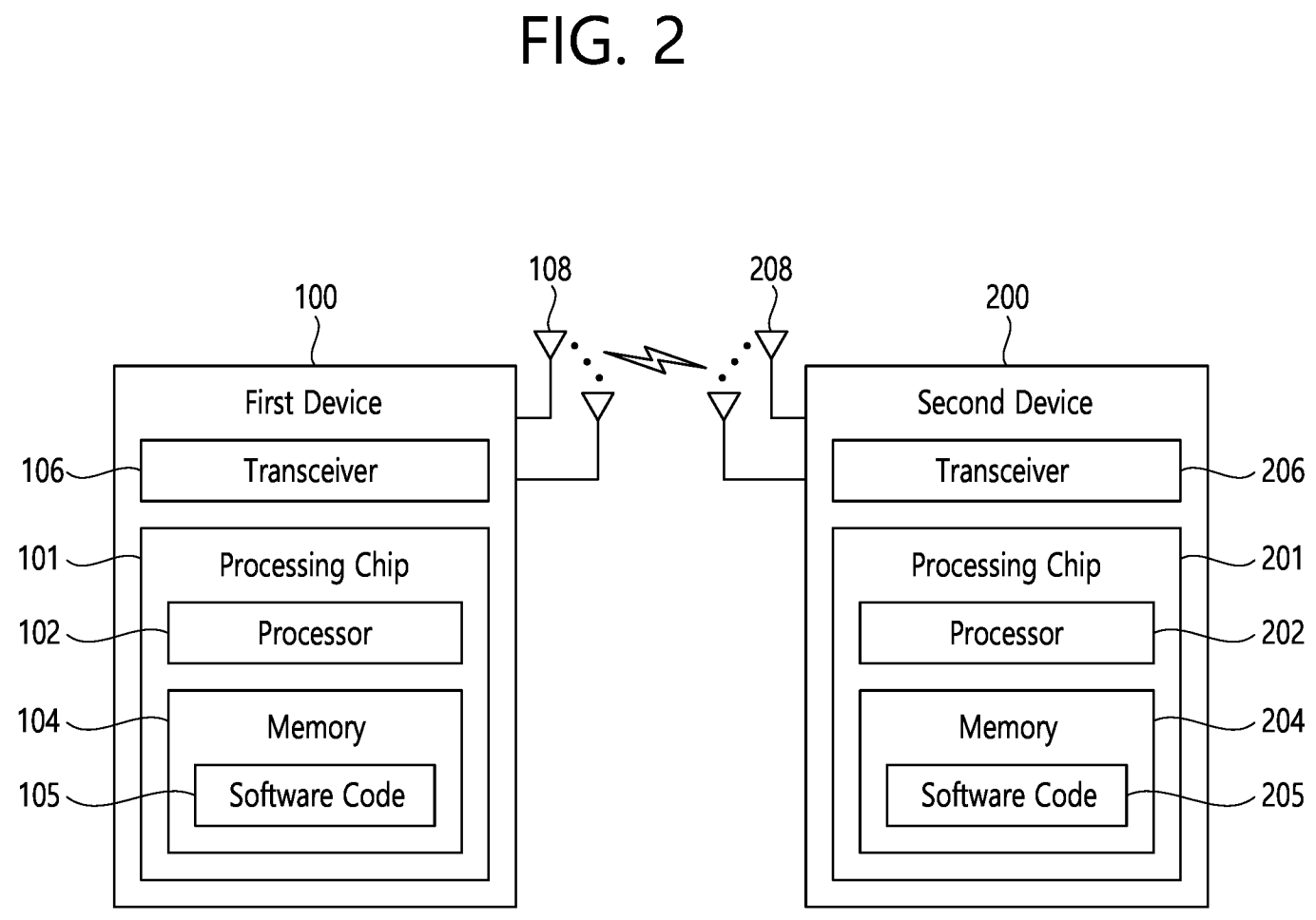

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver.

The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 illustrates an example of a structure of an NR system to which the implementation of the present disclosure is applied.

FIG. 4 shows a structure of an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In the case that a normal CP is used, each slot may include 14 symbols. In the case that an extended CP is used, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Figure 5:
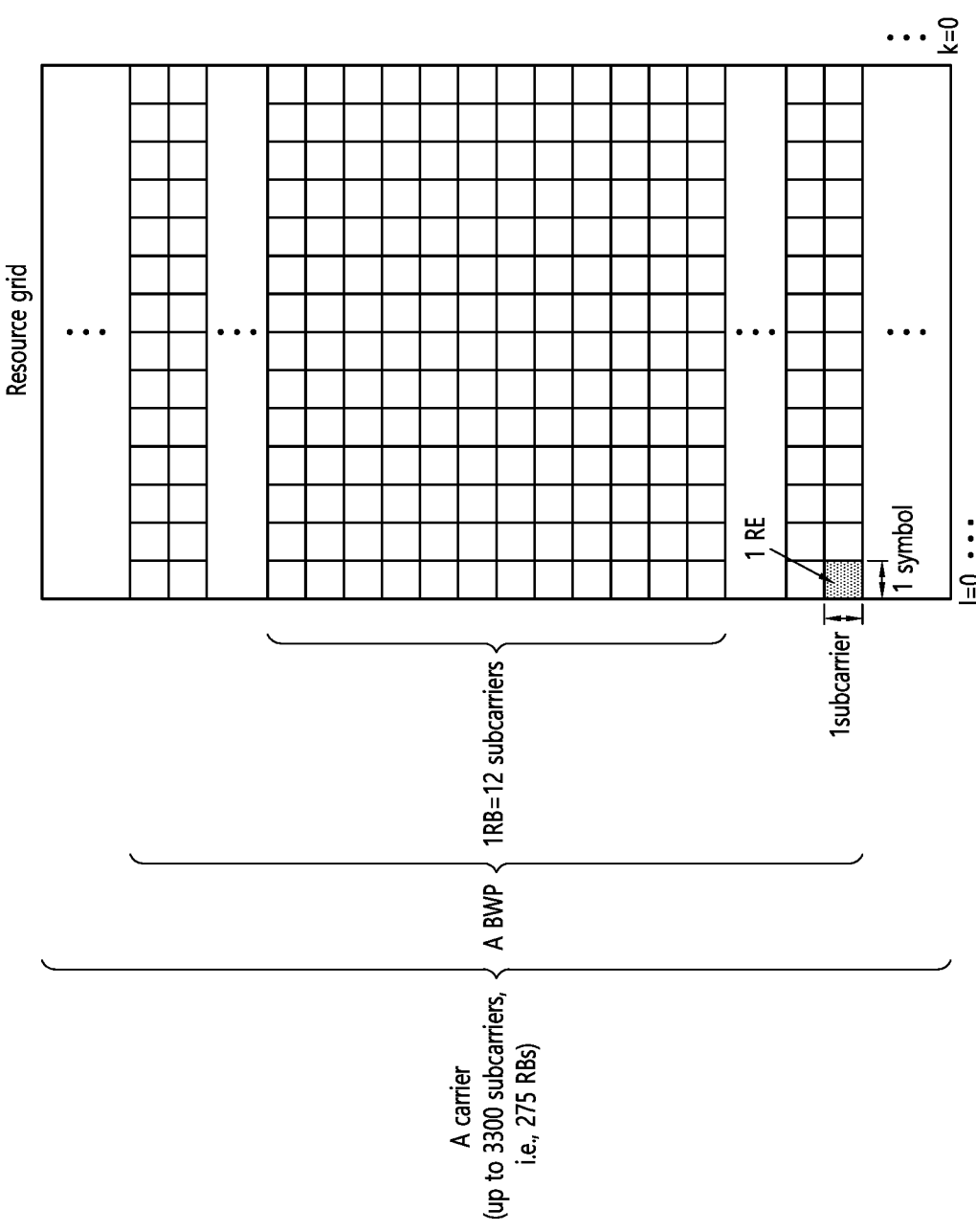
FIG. 5 illustrates an example of a structure of a slot of an NR system to which the implementation of the present disclosure is applied.

FIG. 5 illustrates an example of a structure of a slot of an NR system to which the implementation of the present disclosure is applied.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one type of numerology (e.g., SCS, CP length, etc.). A carrier may include a maximum of N BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, V2X or SL communication will be described.

Figure 6A:
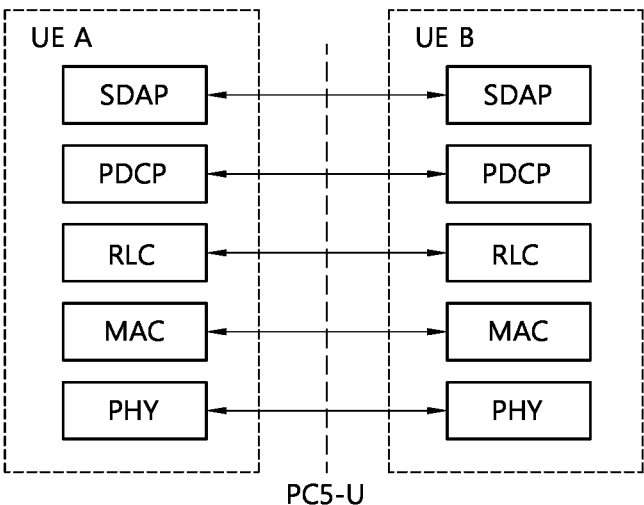
FIGS. 6a and 6b illustrate an example of a radio protocol architecture for a SL communication to which the implementation of the present disclosure is applied.
Figure 6B:
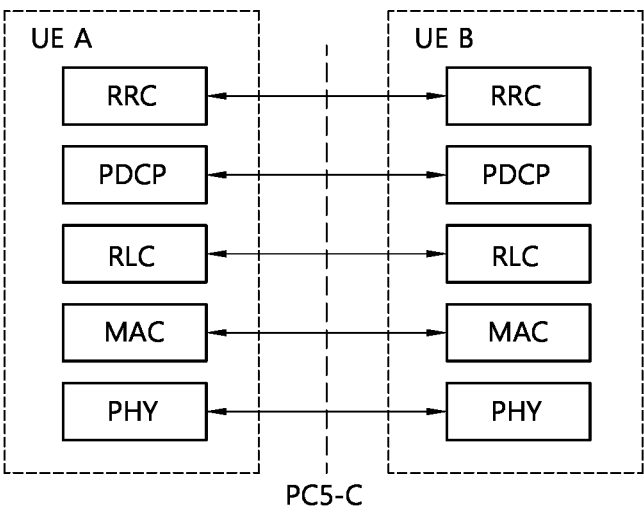

FIGS. 6*a* and 6*b* illustrate an example of a radio protocol architecture for a SL communication to which the implementation of the present disclosure is applied.

FIG. 6*a* and FIG. 6*b* show a radio protocol architecture for a SL communication, in accordance with an embodiment of the present disclosure. The embodiment of FIG. 6*a* and FIG. 6*b* may be combined with various embodiments of the present disclosure. More specifically, FIG. 6*a* shows a user plane protocol stack, and FIG. 6*b* shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which needs to be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 7 illustrates an example of a UE performing V2X or SL communication to which the implementation of the present disclosure is applied.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term "terminal" may generally imply a UE of a user. However, in the case that a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, in the case that the UE 1 is within a connectivity range of the BS, the BS may inform the UE 1 of the resource pool. On the other hand, in the case that the UE 1 is out of the connectivity range of the BS, another UE may inform the UE 1 of the resource pool, or the UE 1 may use a pre-configured resource pool.

In general, the resource pool may be configured in units of a plurality of resources, and each UE may select a unit of one or a plurality of resources to use it in SL signal transmission thereof.

Hereinafter, resource allocation in SL will be described.

Figure 8A:
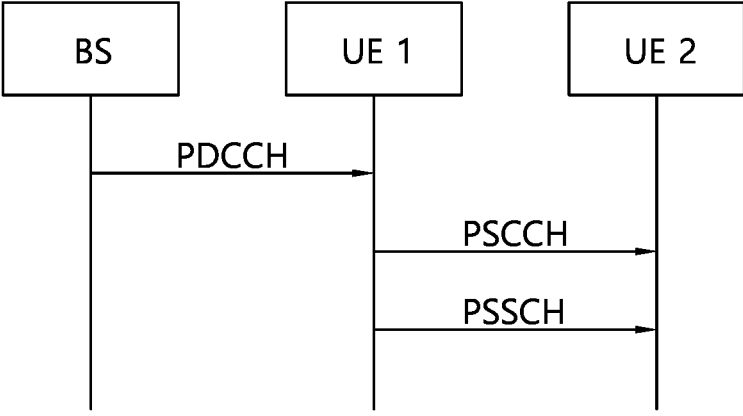
FIGS. 8a and 8b illustrate an example of a procedure of performing V2X or SL communication by a UE based on a transmission mode to which the implementation of the present disclosure is applied.
Figure 8B:
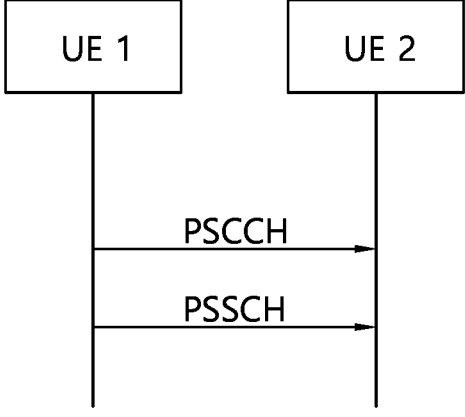

FIGS. 8a and 8b illustrate an example of a procedure of performing V2X or SL communication by a UE based on a transmission mode to which the implementation of the present disclosure is applied.

FIG. 8a and FIG. 8b show a procedure of performing V2X or SL communication by a UE based on a transmission mode, in accordance with an embodiment of the present disclosure. The embodiment of FIG. 8a and FIG. 8b may be combined with various embodiments of the present disclosure. In various embodiments of the present disclosure, the transmission mode may be called a mode or a resource allocation mode. Hereinafter, for the convenience of explanation, in LTE, the transmission mode may be called an LTE transmission mode. In NR, the transmission mode may be called an NR resource allocation mode.

For example, FIG. 8a shows a UE operation related to an LTE transmission mode 1 or an LTE transmission mode 3. Alternatively, for example, FIG. 8a shows a UE operation related to an NR resource allocation mode 1. For example, the LTE transmission mode 1 may be applied to general SL communication, and the LTE transmission mode 3 may be applied to V2X communication.

For example, FIG. 8b shows a UE operation related to an LTE transmission mode 2 or an LTE transmission mode 4. Alternatively, for example, FIG. 8b shows a UE operation related to an NR resource allocation mode 2.

Referring to FIG. 8a, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 8b, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in units of subchannels. In addition, the UE 1 which has autonomously selected the resource within the resource pool may transmit the SCI to the UE 2 through a PSCCH, and thereafter may transmit data based on the SCI to the UE 2 through a PSSCH.

For reference, Table 3 below represents an example of an operating band used for V2X (or SL) communication.

TABLE 3

| Operating Band | V2X Band Operating | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 47 | 47 | 5855 MHz-5925 MHz | 5855 MHz-5925 MHz | HD(Half Duplex) | PC5 |

TABLE 3-continued

| Operating Band | V2X Band Operating | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 39 | 39 | 1880 MHz-1920 MHz | 1880 MHz-1920MHz | TDD | PC5 and/ or Uu |

In the case that an operating band 47 according to the example of Table 3 is used for E-UTRA V2X (or SL) communication, the operating band 47 may be referred to as B47. In the case that the operating band 47 according to the example of Table 3 is used for NR V2X (or SL) communication, the operating band 47 may be referred to as n47.

In the case that an operating band 39 according to the example of Table 3 is used for E-UTRA V2X (or SL) communication, the operating band 39 may be referred to as B39. In the case that the operating band 39 according to the example of Table 3 is used for NR V2X (or SL) communication, the operating band 39 may be referred to as n39.

For reference, at least one proposal scheme proposed according to various embodiments of the present disclosure may be applied to not only sidelink communication or V2X communication based on a PC5 interface or an SL interface (e.g., PSCCH, PSSCH, PSBCH, PSSS/SSSS, etc.), but also sidelink communication or V2X communication based on a Uu interface (e.g., PUSCH, PDSCH, PDCCH, PUCCH, etc.).

In the various embodiments of the present disclosure, a receiving operation of a UE may include a decoding operation and/or a receiving operation of a sidelink channel and/or a sidelink signal (e.g., PSCCH, PSSCH, PSFCH, PSBCH, PSSS/SSSS, etc.). In the various embodiments of the present disclosure, a transmitting operation of a UE may include a transmitting operation of a sidelink channel and/or a sidelink signal (e.g., PSCCH, PSSCH, PSFCH, PSBCH, PSSS/SSSS, etc.).

Meanwhile, in the various embodiments of the present disclosure, for example, for the convenience of description, a (physical) channel used for an RX UE to transmit at least one of the following information to a TX UE may be referred to as PSFCH.

SL HARQ Feedback, SL CSI, SL (L1) RSRP

Meanwhile, in the various embodiments of the present disclosure, a Uu channel may include a UL channel and/or a DL channel. For example, the UL channel may include PUSCH, PUCCH, and the like. For example, the DL channel may include PDCCH, PDSCH, and the like. For example, an SL channel may include PSCCH, PSSCH, PSFCH, PSBCH, and the like.

II. Disclosures of the Present Specification

The disclosures described below in the present specification may be implemented in one or more combinations (e.g., a combination including at least one of the contents described below). Each of the drawings shows an embodiment of the present disclosure, but the embodiments of the drawing may be implemented in combination with each other.

The description of the method proposed in the disclosure of the present specification may be composed of a combination of one or more operations/configurations/steps described below. The following methods described below may be performed or used in combination or complementarity.

For reference, in the disclosure of the present specification, sidelink (SL), V2X, V2X sidelink (SL) may have the same meaning.

An NR terminal performing SL communication must be able to select or reselect a synchronization reference source. Meanwhile, a terminal supporting Frequency Range 2 (1-R2) SL communication may perform a beam management operation. However, in the prior art, an operation related to selection or reselection of a synchronization reference source for a terminal supporting FR2 SL communication was not specifically defined. Due to this, there is a problem that the NR terminal cannot clearly or effectively perform SL communication.

The disclosure herein describes operations related to selection and reselection of a synchronization reference source in NR SL communication. For example, in the disclosure of the present specification Selection/Reselection-related operations for synchronization reference sources of NR SLs (e.g., FR1 NR SL, 1-R2 NR SL) will be described, referring to various examples.

For example, the disclosure of the present specification proposes an operation of selecting a synchronization reference source for a terminal supporting FR2 Sidelink (SL).

For example, in order for a terminal to select/reselect a Synchronization reference source as a Synchronization Reference (SyncRef) UE, the terminal supporting SL may stop its own SLSS transmission or data transmission operation and perform an operation of detecting (receiving) the SLSS of the SyncRef UE. For example, in relation to the SL supporting terminal stopping (or dropping) its SLSS transmission or Data transmission operation, the allowable transmission drop rate is explained as an example below for the FR1 NR SL terminal and the FR2 NR SL terminal.

1. First Example of the Disclosures of the Present Specification

The first example of the disclosure of the present specification proposes an operation of a terminal supporting FR1 NR SL communication with reference to various examples. The content described in the first example of the disclosure of the present specification can be applied to sidelink communication. For example, the contents described in the first example of the disclosure of the present specification may be applied to sidelink services, NR V2X, Public Safety, Device to Device (D2D), commercial use cases, and the like.

i) Case 1

In the case of a terminal supporting FR1 SL communication, based on Rel-16 NR V2X terminal operation (3GPP TS38.133 V16.3.0), the following example may be performed.

Selection and/or reselection of the NS SL synchronization reference source will be described.

For reference, the description below does not apply to a UE that does not support transmission and reception of a sidelink synchronization signal (SLSS).

A terminal supporting FR1 SL communication may detect (or detect) a SyncRef UE.

For example, a SyncRef UE may be considered detectable for the following examples:

If the side condition related to PSBCH-RSRP given in Section 10 of 3GPP TS38.133 V16.3.0 is satisfied for the corresponding band, When V2X SCH_RP and SCH Ês/Iot according to Annex B of 3GPP TS38.133 V16.3.0 for the corresponding band are satisfied. Here, SCH_RP may mean received power of a synchronization signal. SCH Ês/Iot may mean reception SINR (Ês=received energy per RE, Iot=received power spectral density of the total Noise and Interference per RE) of the synchronization signal.

i-1) Case 1-1

In Case 1-1, for the synchronization reference source of the terminal supporting FR1 SL communication, the selection and/or reselection of the NS SL synchronization reference source when Global navigation satellite system (GNSS) is set to the highest priority is described.

i-1-a) When the UE is Directly Synchronized to GNSS

For the synchronization reference source, when GNSS is set to the highest priority and the UE is directly synchronized to GNSS, the UE may perform the following actions:

The UE shall not drop NR SLSS and NR SL data transmission in order to select/reselect the synchronization reference source to SyncRef UE. In other words, the UE may not perform an operation of detecting a signal to select/reselect the synchronization reference source as the SyncRef UE.

For example, the synchronization reference source of a SyncRef UE may also be GNSS. In this case, if the UE is directly synchronized to GNSS, the UE may not drop the NR SLSS and NR SL data transmissions because it may already be synchronized with the SyncRef UE.

i-1-b) When the UE is Directly or Indirectly Synchronized to a SyncRef UE Synchronized to GNSS For the synchronization reference source, when GNSS is set to the highest priority and the UE is directly or indirectly synchronized to a SyncRef UE synchronized to GNSS, the UE may perform the following actions:

UE shall not drop NR SL data transmission to select/reselect synchronization reference source to SyncRef UE. If the SyncRef UE meets selection/reselection criteria defined in 3GPP TS 38.331 V16.1.0 (e.g., when the priority for SL communication (sl-SyncPriority) is set to gnss), the UE must be able to identify a newly detectable intra frequency SyncRef UE within the detection time (e.g., $T_{detect, SyncRef\ UE\_SL}$ seconds). For example, the UE may detect the SL signal (e.g., SLSS) of the SyncRef UE within the detection time. $T_{detect,SyncRef\ UE\_SL}$ can be defined as 1.6 seconds at SCH Es/Iot≥0 dB. For example, "$T_{detect,SyncRef\ UE\_SL}$ defined as 1.6 seconds at SCH Es/Iot≥0 dB" may mean the following. When the reception SINR of the Synchronization signal of the SyncRef UE received by the UE is at least 0 dB or more, the UE must be able to detect the SyncRef UE within 1.6 seconds.

The UE may drop up to 30% of the UE's SLSS transmissions during $T_{detect,SyncRef\ UE\_SL}$ to select/reselect the synchronization reference source to SyncRef.

i-1-c) In Other Case

For the synchronization reference source, if GNSS is set to the highest priority, and other than the two cases (e.g., "i-1-a) UE synchronized directly to GNSSS" and "i-1-b) UE synchronized directly or indirectly to SyncRef UE synchronized to GNSS") described in the example above, the UE may perform the following operations:

When the SyncRef UE meets the selection/reselection criteria defined in TS 38.331 V16.1.0, the UE must be able to identify a newly detectable intra frequency SyncRef UE within the detection time (e.g., $T_{detect, SyncRef\ UE\_SL}$ seconds). For example, the UE may detect the SL signal (e.g., SLSS) of the SyncRef UE within the detection time. $T_{detect,SyncRef\ UE\_SL}$ can be defined as 8 seconds in SCH Es/Iot≥0 dB. To select/reselect the sync reference source to SyncRef, the UE may be allowed to drop up to 6% of the NR SL data transmission and NR SLSS transmission of the UE during $T_{detect,SyncRef\ UE\_SL}$.

The UE may drop NR SL data reception per PSBCH monitoring occasion up to 2 slots. And, the overall drop rate should not exceed 0.3% of NR SL data reception during $T_{detect,SyncRef\ UE\_SL}$ for selection/reselection of SyncRef UE.

i-2) Case 1-2

In Case 1-2, selection and/or reselection of the NS SL synchronization reference source will be described, for the synchronization reference source of the terminal supporting FR1 SL communication, when the serving cell and/or PCell (Primary cell) is set to the highest priority.

The UE may perform operations such as the following examples:

The UE must be able to identify a newly detectable intra frequency SyncRef UE within the detection time (e.g. $T_{detect, SyncRef\ UE\_SL}$ seconds) if the SyncRef UE meets the selection/reselection criteria defined in TS 38.331. For example, the UE may detect the SL signal (e.g., SLSS) of the SyncRef UE within the detection time. $T_{detect,SyncRef\ UE\_SL}$ can be defined as 8 seconds in SCH Es/Iot≥0 dB. To select/reselect the sync reference source to SyncRef, the UE may be allowed to drop up to 6% of the NR SL data transmission and NR SLSS transmission of the UE during $T_{detect,SyncRef\ UE\_SL}$.

The UE may drop NR SL data reception per PSBCH monitoring occasion up to 2 slots. And, the overall drop rate should not exceed 0.3% of NR SL data reception during $T_{detect,SyncRef\ UE\_SL}$ for selection/reselection of SyncRef UE.

The UE must be able to perform S-RSRP measurements for the identified three intra-frequency NR SL SyncRef. The UE must be able to perform PSBCH-RSRP measurements for SyncRef UEs within the identified three frequencies with a measurement period of 320 ms. It is assumed that the SyncRef UE does not drop or delay SLSS transmission within the measurement period. Otherwise, the measurement period may be extended.

When the UE synchronizes directly to GNSS, before selection/reselection of a new synchronization reference source, the UE may evaluate the GNSS synchronization source reliability for at least 20 seconds before changing the synchronization reference from GNSS to another synchronization reference source. While the UE performs reliability evaluation of the GNSS synchronization source, the UE should always synchronize directly to GNSS.

Hereinafter, the operation of the terminal according to the first example of the disclosure of the present specification will be described with reference to FIG. 9.

The following drawings are made to explain a specific example of the present specification. Since the names of specific devices or names of specific signals/messages/fields described in the drawings are provided as examples, the technical features of the present specification are not limited to the specific names used in the drawings below.

US 12,652,631 B2

21

Figure 9:
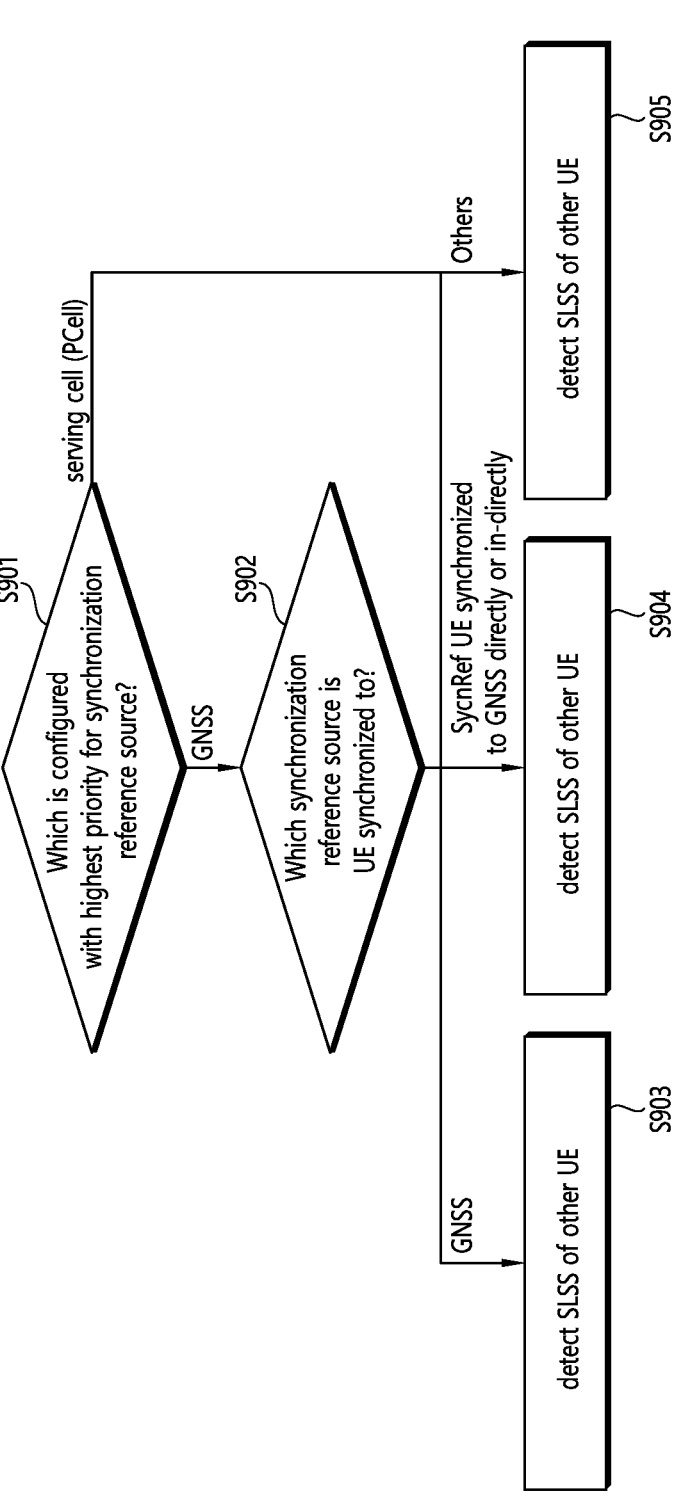
FIG. 9 shows an example of an operation of a terminal according to a first example of the disclosure of the present specification.

FIG. 9 shows an example of an operation of a terminal according to a first example of the disclosure of the present specification.

In the case of a terminal supporting FR1 SL communication, an operation for selecting and/or reselecting an N TI SL synchronization reference source may be performed according to the example of FIG. 9.

FIG. 9 shows an example of an operation of a terminal according to a first example of the disclosure of the present specification. The content shown in FIG. 9 is only an example, and the scope of the disclosure of the present specification is not limited by FIG. 9. The terminal is not limited by the example of FIG. 9 and may perform operations according to the first example of the present disclosure described through various examples above.

In step S901, the terminal may determine which synchronization reference source is set to the highest priority. For example, the synchronization reference source set to the highest priority may be a serving cell (PCell) or GNSS.

When the synchronization reference source set to the highest priority is the serving cell (PCell), the terminal may perform step S905. When the synchronization reference source set to the highest priority is GNSS, the terminal may perform step S902.

In step S902, the terminal may determine what synchronization reference source the terminal is synchronized with. For example, the synchronization reference source to which the UE is synchronized may be GNSS, a SyncRef UE synchronized directly or indirectly with GNSS, or other case (e.g., i-1-c) in other case). Here, the other case may include a case where the reference source with which the UE is synchronized is a SyncRef UE or a serving cell (PCell) that is not directly or indirectly synchronized with GNSS.

In step S903, the terminal may detect an SL signal (e.g., SLSS) of other UE. In step S903, the terminal may perform an operation according to "i-1-a" when the UE is directly synchronized with the GNSSS" described above. For example, the UE may not drop NR SLSS and NR SL data transmissions to select/reselect the synchronization reference source to SyncRef UE.

In step S904, the UE may detect an SL signal (e.g., SLSS) of another UE. In step S904, the terminal may perform an operation according to "i-1-b" when the UE is directly or indirectly synchronized with the SyncRef UE synchronized with the GNSS" described above. For example, the UE should not drop NR SL data transmission to select/reselect the synchronization reference source to SyncRef UE. The UE must be able to identify a newly detectable intra frequency SyncRef UE within the detection time (e.g. $T_{detect,\ SyncRef\ UE\_SL}$ seconds) if the SyncRef UE meets the selection/reselection criteria defined in TS 38.331. For example, the UE may detect the SL signal (e.g., SLSS) of the SyncRef UE within the detection time. $T_{detect,SyncRef\ UE\_SL}$ can be defined as 1.6 seconds in SCH Es/Iot≥0 dB. To select/reselect the sync reference source to SyncRef, the UE may be allowed to drop up to 30% of the SLSS transmission of the UE during $T_{detect,SyncRef\ UE\_SL}$.

In step S905, the UE may detect an SL signal (e.g., SLSS) of another UE. In step S905, the terminal may perform an operation according to "i-1-c" in other case" or Case 1-2 described above. For example, the UE may drop NR SLSS and NR SL data transmissions to select/reselect the synchronization reference source to SyncRef UE. The UE must be able to identify a newly detectable intra frequency SyncRef UE within the detection time (e.g. $T_{detect,\ SyncRef\ UE\_SL}$ seconds) if the SyncRef UE meets the selection/reselection criteria defined in TS 38.331. For example, the UE may detect the SL signal (e.g., SLSS) of the SyncRef UE within the detection time. $T_{detect,SyncRef\ UE\_SL}$ can be defined as 8 seconds in SCH Es/Iot≥0 dB. To select/reselect the sync reference source to SyncRef, the UE may be allowed to drop up to 6% of the NR SL data transmission and NR SLSS transmission of the UE during $T_{detect,SyncRef\ UE\_SL}$. The UE may drop NR SL data reception per PSBCH monitoring occasion up to 2 slots. And, the overall drop rate should not exceed 0.3% of NR SL data reception during $T_{detect,SyncRef\ UE\_SL}$ for selection/reselection of SyncRef UE.

2. The Second Example of the Disclosure of the Present Specification

The second example of the disclosure of the present specification refers to various examples, and proposes an operation of a terminal supporting FR2 NR SL communication. The content described in the second example of the disclosure of the present specification can be applied to sidelink communication. For example, the content described in the second example of the disclosure of the present specification can be applied to Sidelink services, NR V2X, Public Safety, Device to Device (D2D), commercial use cases, and the like.

ii) Case 2

In the case of a terminal supporting FR2 SL communication, FR2 SL beam management may or may not be applied to the operation of the terminal. In other words, with respect to the terminal supporting FR2 SL communication, the operation of the terminal according to the case where FR2 SL beam management is applied and the case where FR2 SL beam management is not applied will be described.

When SL beam management is applied to a terminal supporting FR2 SL communication, a time to detect the sidelink synchronization signal (SLSS) of the FR2 SyncRef UE (e.g., $T_{detect,\ SyncRef\ UE\_SL}$) may need to be defined based on the UE's beam operation. And based on this, in order to detect the SLSS of the FR2 SyncRef UE, a drop rate at which the terminal does not transmit its own SLSS or data may be determined. The operation of the terminal is proposed with reference to various examples below.

Selection and/or reselection of the NS SL synchronization reference source will be described.

For reference, the description below does not apply to a UE that does not support transmission and reception of a sidelink synchronization signal (SLSS).

For example, when SL beam management is applied, a SyncRef UE may be considered detectable in the following example:

When the PSBCH-RSRP related side condition (e.g., the example in Table 4) is satisfied.

TABLE 4

| Absolute Accuracy | | | Relative Accuracy | | |
|---|---|---|---|---|---|
| Normal condition dB | Extreme condition dB | Conditions Ês/Iot dB | Normal condition dB | Extreme condition dB | Conditions Ês/Iot dB |
| ±6 | ±9 | ≥−6 | ±6 | ±9 | ≥−6 |

The example of Table 4 may be an example of a side condition that must be satisfied for the PSBCH-RSRP measured by the UE. A UE may measure PSBCH-RSRP based on a PSBCH received from another UE. Here, Ês/Iot may mean a received SINR (Signal to {Noise and Interference} Ratio). Absolute Accuracy may mean the absolute accuracy of the measured RSRP. For example, absolute accuracy can be expressed as measured RSRP lute accuracy. Relative Accuracy may mean the relative accuracy of the measured RSRP, represented by the maximum value among 95%-50% and 5%-50% of the measured RSRP Cumulative Distribution Function (CDF). Ês/Iot may mean SINR when measuring PSBCH-RSRP. Here, the normal condition may mean, for example, when the temperature of the terminal is +15 to +35 degrees. Extreme condition may mean, for example, when the terminal temperature is −10 degrees to +55 degrees.

ii-1) Case 2-1

In Case 2-1, for the synchronization reference source of a terminal supporting FR2 SL communication, selection and/ or reselection of the NS SL synchronization reference source when GNSS is set to the highest priority will be described.

ii-1-a) When the UE is Directly Synchronized to GNSSS

For the synchronization reference source, when GNSS is set to the highest priority and the UE is directly synchronized to GNSS, the UE may perform the following operations:

The UE shall not drop NR SLSS and NR SL data transmission in order to select/reselect the synchronization reference source to SyncRef UE. In other words, the UE may not perform an operation of detecting a signal to select/reselect the synchronization reference source as the SyncRef UE.

For example, the synchronization reference source of a SyncRef UE may also be GNSS. In this case, if the UE is directly synchronized to GNSS, the UE may not drop the NR SLSS and NR SL data transmissions because it may already be synchronized with the SyncRef UE.

ii-1-b) When the UE is Synchronized Directly or Indirectly to a SyncRef UE Synchronized to GNSS For the synchronization reference source, when GNSS is set to the highest priority and the UE is directly or indirectly synchronized to a SyncRef UE synchronized to GNSS, the UE may perform the following operations:

UE shall not drop NR SL data transmission to select/ reselect synchronization reference source to SyncRef UE. If the SyncRef UE meets selection/reselection criteria defined in 3GPP TS 38.331 V16.1.0 (e.g., when the priority for SL communication (sl-SyncPriority) is set to gnss), the UE must be able to identify a newly detectable intra frequency SyncRef UE within the detection time (e.g., $T_{detect, SyncRef\ UE\_SL}$ seconds). For example, the UE may detect the SL signal (e.g., SLSS) of the SyncRef UE within the detection time. $T_{detect, SyncRef\ UE\_SL}$ can be defined as X1 seconds at SCH Es/Iot≥0 dB. The UE may drop up to Y1% of the UE's SLSS transmissions during $T_{detect, SyncRef\ UE\_SL}$ to select/reselect the synchronization reference source to SyncRef.

Here, X1 may be an example of a detection time considering the number of beams operated by a terminal supporting FR2 SL communication. Y1 may be an example of a maximum drop rate considering the number of beams operated by a terminal supporting FR2 SL communication.

For example, when a terminal supporting FR2 SL communication (hereinafter also referred to as "FR2 SL terminal") performs SL communication, for SLSS detection, the number of beams of the used UE may be considered. As described above in the first example of the disclosure of the present specification, for $T_{detect, SyncRef\ UE\_SL}$ ($T_{detect, SyncRef\ UE\_SL}$ of FR1 SyncRef UE) for a terminal supporting FR1 SL communication to detect a signal of an FR1 SyncRef UE, by applying maximum drop rate=30%, it is proposed to be 1.6 seconds (10 times the S-SSB period=160 ms×10). Here, the period of the S-SSB may be 160 ms. Assuming that the FR2 SL terminal operates N beams, when applying the same maximum drop rate as the maximum drop rate used to detect the signal of the FR1 SyncRef UE, $T_{detect, SyncRef\ UE\_SL}$ ($T_{detect, SyncRef\ UE\_SL}$ of FR2 SyncRef UE)=N×1.6 seconds for detecting the signal of FR2 SyncRef UE may be defined. Considering the number of beams operated by the FR2 SL terminal (e.g., operation of 4 to 8 beams) (N=4 to 8), $T_{detect, SyncRef\ UE\_SL}$=6.4 seconds to 12.8 seconds is proposed. As an example, it may be $T_{detect, SyncRef\ UE\_SL}$=9.6 seconds.

For example, the maximum drop rate Y1 may be 30%. And, $T_{detect, SyncRef\ UE\_SL}$, X1=6.4 seconds~12.8 seconds are suggested. As an example, it may be $T_{detect, SyncRef\ UE\_SL}$=9.6 seconds.

As another example, the maximum date rate may be set greater than 30%. As described above, if maximum drop rate=30% is applied, $T_{detect, SyncRef\ UE\_SL}$ of the FR2 SL supporting terminal may become longer. To reduce the $T_{detect, SyncRef\ UE\_SL}$ time, the maximum drop rate may be set higher than 30%.

Based on the FR1 SL terminal, the maximum drop rate of 30% means that a maximum of 3 samples are required to detect SLSS. If the maximum drop rate is changed, the sample interval for detecting up to three samples may be changed. For example, when the maximum drop rate is increased to 50%, a maximum of 6 sample intervals must be secured to ensure that 3 samples are 50% based on the S-SSB cycle of 160 ms. In other words, if the terminal drops up to 50% in a 6-sample interval, 3 samples can be guaranteed. Taking the case of FR1 SyncRef UE as an example first, in FR1 SyncRef UE's $T_{detect, SyncRef\ UE\_SL}$=960 ms (160 ms×6), it may be maximum drop rate=50%. Based on this, in the case of an FR2 SyncRef UE operating N beams, if maximum drop rate=50% is applied, $T_{detect, SyncRef\ UE\_SL}$ of FR2 SyncRef UE can be N×960 ms. As $T_{detect, SyncRef\ UE\_SL}$ of FR2 SyncRef UE with maximum drop rate=30% is N×1.6 seconds, in preparation for the case where the maximum drop rate=30% is applied, the detection time related to Tdetect and SyncRef UE_SL of the FR2 SyncRef UE is reduced.

$T_{detect\ and\ SyncRef\ UE\_SL}$ of FR2 SyncRef UE are proposed as follows for each maximum drop rate. For reference, in the following example, X1 may be calculated as (6.4 to 12.8) *30/Y1.

When Maximum drop rate Y1=50%, $T_{detect\ and\ SyncRef\ UE\_SL}$, X1 may be 3.84 seconds to 7.68 seconds. As an example, 5.76 seconds is suggested.

When the maximum drop rate, Y1=60%, $T_{detect\ and\ SyncRef\ UE\_SL}$, X1 may be 3.2 seconds to 6.4 seconds. As an example, 4.8 seconds is suggested.

When the maximum drop rate, Y1=75%, $T_{detect\ and\ SyncRef\ UE\_SL}$, X1 may be 2.56 seconds to 5.12 seconds. As an example, 3.84 seconds is suggested.

When Maximum drop rate, Y1=100%, $T_{detect\ and\ SyncRef\ UE\_SL}$, X1 may be 1.92 seconds to 3.84 seconds. As an example, 2.88 seconds is suggested.

ii-1-c) In Other Case

For synchronization reference source, GNSS is set to the highest priority, in cases other than the two cases (e.g., "ii-1-a) UE synchronized directly to GNSSS" and "ii-1-b) UE synchronized directly or indirectly to SyncRef UE synchronized to GNSS") described in the above example, the UE may perform the following operations:

When the SyncRef UE meets the selection/reselection criteria defined in 3GPP TS 38.331 V16.1.0, the UE must be able to identify a newly detectable intra frequency SyncRef UE within the detection time (e.g., $T_{detect, SyncRef UE\_SL}$ seconds). $T_{detect,SyncRef UE\_SL}$ may be defined as X2 seconds at SCH Es/Iot≥0 dB. To select/reselect the sync reference source to SyncRef, the UE may be allowed to drop up to Y2% of the UE's NR SL data transmission and NR SLSS transmission during $T_{detect,SyncRef UE\_SL}$.

The UE may drop NR SL data reception per PSBCH monitoring occasion up to 2 slots. And, for selection/reselection to SyncRef UE, the overall drop rate is must not exceed Y3% of NR SL data reception during $T_{detect,SyncRef UE\_SL}$.

Here, X2 may be an example of a detection time considering the number of beams operated by a terminal supporting FR2 SL communication. Y2 and Y3 may be examples of maximum drop rates considering the number of beams operated by a terminal supporting FR2 SL communication. For reference, Y2 may be the maximum drop rate at which the UE drops NR SL data transmission and NR SLSS transmission. Y3 may be the maximum drop rate at which the UE drops NR SL data reception.

For example, when a terminal supporting FR2 SL communication (hereinafter, also referred to as "FR2 SL terminal") performs SL communication, the number of beams of the used terminal may be considered for SLSS detection. As described above in the first example of the disclosure of the present specification (e.g., "i-1-c) in other cases"), $T_{detect,SyncRef UE\_SL}$ ($T_{detect,SyncRef UE\_SL}$ of FR1 SyncRef UE) for a terminal supporting FR1 SL communication to detect the signal of FR1 SyncRef UE is defined as 8 seconds (50 times the S-SSB cycle=160 ms×50). Here, the period of the S-SSB may be 160 ms. Assuming that the FR2 SL terminal operates N beams, when applying the same maximum drop rate as the maximum drop rate (eg 6%) used to detect the signal of the FR1 SyncRef UE, it can be defined as $T_{detect,SyncRef UE\_SL}$ ($T_{detect,SyncRef UE\_SL}$ of FR2 SyncRef UE)=N×8 seconds for detecting the signal of FR2 SyncRef UE. Considering the number of beams operated by the FR2 SL terminal (e.g., operation of 4 to 8 beams) (N=4 to 8), $T_{detect,SyncRef UE\_SL}$=32 seconds to 64 seconds is proposed. For example, $T_{detect,SyncRef UE\_SL}$=48 seconds.

For example, the maximum drop rate Y2 may be 6% and Y3=0.3%. And, $T_{detect,SyncRef UE\_SL}$, X2=32 seconds~64 seconds is suggested. For example, $T_{detect,SyncRef UE\_SL}$=48 seconds.

As another example, the maximum date rate may be set greater than 6% and 0.3%. As described above, if the maximum drop rate, Y2=6%, Y3=0.3% is applied, the $T_{detect, SyncRef UE\_SL}$ of the FR2 SL supporting terminal may become longer. To reduce the $T_{detect,SyncRef UE\_SL}$ time, the maximum drop rate may be set higher than 6% or 0.3%.

Based on the FR1 SL terminal, the maximum drop rate Y2=6% means that a maximum of 3 samples are required to detect SLSS. For reference, there are 50 S-SSB samples during the 8 seconds interval (S-SSB period=160 ms). Therefore, if the maximum drop rate is changed, the sample interval for detecting up to three samples may be changed. For example, if the maximum drop rate, Y2=15%, in order to guarantee that 3 samples are 15% based on the S-SSB cycle of 160 ms, a maximum of 20 sample intervals must be secured. In other words, the terminal drops up to 15% in a 20-sample interval, 3 samples can be guaranteed. Taking the case of FR1 SyncRef UE as an example first, at $T_{detect,SyncRef UE\_SL}$=3.2 s (160 ms×20) of FR1 SyncRef UE, it may be maximum drop rate=15%. Based on this, in the case of an FR2 SyncRef UE operating N beams, applying the maximum drop rate, Y2=15%, $T_{detect,SyncRef UE\_SL}$ of FR2 SyncRef UE can be=N×3.2 s. $T_{detect,SyncRef UE\_SL}$ of FR2 SyncRef UE with maximum drop rate=6% is N×8 seconds, if maximum drop rate=15% is applied, $T_{detect, SyncRef UE\_SL}$ of FR2 SyncRef UE reduces detection time in preparation for the case where maximum drop rate=6% is applied.

$T_{detect,SyncRef UE\_SL}$ of FR2 SyncRef UE are proposed as follows for each maximum drop rate. For reference, in the following example, X2 may be calculated as (32~64)*6/Y2.

When Maximum drop rate, Y2=10%, Y3=0.5%, $T_{detect,SyncRef UE\_SL}$, X2=19.2 seconds~38.4 seconds. As an example, 28.8 seconds is suggested.

Maximum drop rate, when Y2=12%, Y3=0.6%, $T_{detect,SyncRef UE\_SL}$, X2=16 seconds~32 seconds. As an example, 24 seconds is suggested.

Maximum drop rate, when Y2=15%, Y3=0.75%, $T_{detect,SyncRef UE\_SL}$, X2=12.8 seconds~25.6 seconds. As an example, 19.2 seconds is suggested.

Maximum drop rate, when Y2=20%, Y3=1.0%, $T_{detect,SyncRef UE\_SL}$, X2=9.6 seconds~19.2 seconds. As an example, 14.4 seconds is suggested.

When Maximum drop rate, Y2=30%, Y3=1.5% $T_{detect,SyncRef UE\_SL}$, X2=6.4 seconds~12.8 seconds. As an example, 9.6 seconds is suggested.

ii-2) Case 2-2

In Case 2-2, for the synchronization reference source of the terminal supporting FR2 SL communication, Selection and/or reselection of an NS SL synchronization reference source when a serving cell and/or a primary cell (PCell) is set to the highest priority will be described.

The UE may perform actions such as the following examples:

When the SyncRef UE meets the selection/reselection criteria defined in 3GPP TS 38.331 V16.1.0, the UE must be able to identify a newly detectable intra frequency SyncRef UE within the detection time (e.g., $T_{detect, SyncRef UE\_SL}$ seconds). For example, the UE may detect the SL signal (e.g., SLSS) of the SyncRef UE within the detection time. $T_{detect,SyncRef UE\_SL}$ may be defined as X2 seconds at SCH Es/Iot≥0 dB. In order for the UE to select/reselect the synchronization reference source as SyncRef, it may be allowed to drop up to Y2% of the UE's NR SL data transmission and NR SLSS transmission during $T_{detect,SyncRef UE\_SL}$.

The UE may drop NR SL data reception per PSBCH monitoring occasion up to 2 slots. And, for selection/reselection to SyncRef UE, the overall drop rate is must not exceed Y3% of NR SL data reception during $T_{detect,SyncRef UE\_SL}$.

Here, X2 may be an example of a detection time considering the number of beams operated by a terminal supporting FR2 SL communication. Y2 and Y3 may be examples of maximum drop rates considering the number of beams operated by a terminal supporting FR2 SL communication. For reference, Y2 may be the maximum drop rate at which the UE drops NR SL data transmission and NR SLSS transmission. Y3 may be the maximum drop rate at which the UE drops NR SL data reception.

For example, when a terminal supporting FR2 SL communication (hereinafter, also referred to as "FR2 SL terminal") performs SL communication, the number of beams of the used terminal may be considered for SLSS detection. As described above in the first example of the disclosure of the present specification (e.g., "i-1-c) in other cases"), $T_{detect,SyncRef UE\_SL}$ ($T_{detect,SyncRef UE\_SL}$ of FR1 SyncRef UE) for a terminal supporting FR1 SL communication to detect the signal of FR1 SyncRef UE is defined as 8 seconds (50 times the S-SSB cycle=160 ms×50). Here, the period of the S-SSB may be 160 ms. Assuming that the FR2 SL terminal operates N beams, when applying the same maximum drop rate as the maximum drop rate (eg 6%) used to detect the signal of the FR1 SyncRef UE, it can be defined as $T_{detect,SyncRef\ UE\_SL}$ (Tdetect,SyncRef UE_SL of FR2 SyncRef UE)=N×8 seconds for detecting the signal of FR2 SyncRef UE. Considering the number of beams operated by the FR2 SL terminal (e.g., operation of 4 to 8 beams) (N=4 to 8), $T_{detect,SyncRef\ UE\_SL}$=32 seconds to 64 seconds is proposed. For example, $T_{detect,SyncRef\ UE\_SL}$=48 seconds.

For example, the maximum drop rate Y2 may be 6% and Y3=0.3%. And, $T_{detect,SyncRef\ UE\_SL}$, X2=32 seconds~64 seconds is suggested. For example, $T_{detect,SyncRef\ UE\_SL}$=48 seconds.

As another example, the maximum date rate may be set greater than 6% and 0.3%. As described above, if the maximum drop rate, Y2=6%, Y3=0.3% is applied, the $T_{detect,\ SyncRef\ UE\_SL}$ of the FR2 SL supporting terminal may become longer. To reduce the $T_{detect,SyncRef\ UE\_SL}$ time, the maximum drop rate may be set higher than 6% or 0.3%.

Based on the FR1 SL terminal, the maximum drop rate Y2=6% means that a maximum of 3 samples are required to detect SLSS. For reference, there are 50 S-SSB samples during the 8 seconds interval (S-SSB period=160 ms). Therefore, if the maximum drop rate is changed, the sample interval for detecting up to three samples may be changed. For example, if the maximum drop rate, Y2=15%, in order to guarantee that 3 samples are 15% based on the S-SSB cycle of 160 ms, a maximum of 20 sample intervals must be secured. In other words, the terminal drops up to 15% in a 20-sample interval, 3 samples can be guaranteed. Taking the case of FR1 SyncRef UE as an example first, at $T_{detect,SyncRef\ UE\_SL}$=3.2 s (160 ms×20) of FR1 SyncRef UE, it may be maximum drop rate=15%. Based on this, in the case of an FR2 SyncRef UE operating N beams, applying the maximum drop rate, Y2=15%, $T_{detect,SyncRef\ UE\_SL}$ of FR2 SyncRef UE can be=N×3.2 s. $T_{detect,SyncRef\ UE\_SL}$ of FR2 SyncRef UE with maximum drop rate=6% is N×8 seconds, if maximum drop rate=15% is applied, $T_{detect,\ SyncRef\ UE\_SL}$ of FR2 SyncRef UE reduces detection time in preparation for the case where maximum drop rate=6% is applied.

$T_{detect,SyncRef\ UE\_SL}$ of FR2 SyncRef UE are proposed as follows for each maximum drop rate.

When Maximum drop rate, Y2=10%, Y3=0.5%, $T_{detect,SyncRef\ UE\_SL}$, X2=19.2 seconds~38.4 seconds. As an example, 28.8 seconds is suggested.

Maximum drop rate, when Y2=12%, Y3=0.6%, $T_{detect,SyncRef\ UE\_SL}$, X2=16 seconds~32 seconds. As an example, 24 seconds is suggested.

Maximum drop rate, when Y2=15%, Y3=0.75%, $T_{detect,SyncRef\ UE\_SL}$, X2=12.8 seconds~25.6 seconds. As an example, 19.2 seconds is suggested.

Maximum drop rate, when Y2=20%, Y3=1.0%, $T_{detect,SyncRef\ UE\_SL}$ X2=9.6 seconds~19.2 seconds. As an example, 14.4 seconds is suggested.

When Maximum drop rate, Y2=30%, Y3=1.5% $T_{detect,SyncRef\ UE\_SL}$ X2=6.4 seconds~12.8 seconds. As an example, 9.6 seconds is suggested.

In Case 2-1 and Case 2-2 described with reference to various examples above, as a way to further reduce the X1 and X2 times, in the case of a FR2 SL terminal, it is proposed that M (M≥2) or more SLSSs are basically configured in the S-SSB. For example, when a SyncRef UE transmits one S-SSB, M or more SLSSs may be included in the S-SSB. In this case, X1 and X2 can be reduced by M times while maintaining the same Y1%, Y2%, and Y3%.

For example, when M (M≥2) or more SLSSs are set in the S-SSB, it may be X1=X1 (e.g., X1 in Case 2-1 and Case 2-2)/M. In the case where M (M≥2) or more SLSSs are set in the S-SSB, it may be X2=X2 (e.g., X2 of Case 2-1 and Case 2-2)/M.

For example, assuming that M is 2, the detection time and maximum drop rate may be suggested as in the following example.

In the example of Case 2-1, X1 and Y1 can be proposed as in the following example:

Maximum drop rate, when Y1=30%, $T_{detect,SyncRef\ UE\_SL}$, X1=3.2 seconds~6.4 seconds. As an example, 4.8 seconds is suggested.

Maximum drop rate, when Y1=50%, Tdetect,SyncRef UE_SL, X1=1.92 seconds to 3.84 seconds. As an example, 2.88 seconds is suggested.

Maximum drop rate, when Y1=60%, Tdetect,SyncRef UE_SL, X1=1.6 seconds to 3.2 seconds. As an example, 2.4 seconds is suggested.

Maximum drop rate, when Y1=75%, Tdetect,SyncRef UE_SL, X1=1.28 seconds to 2.56 seconds. As an example, 1.92 seconds is suggested.

Maximum drop rate, when Y1=100%, Tdetect,SyncRef UE_SL, X1=0.96 seconds to 1.92 seconds. As an example, 1.44 seconds is suggested.

In the example of Case 2-2, X2, Y2, and Y3 may be proposed as in the following example:

When Maximum drop rate, Y2=6%, Y3=0.3%, Tdetect, SyncRef UE_SL, X2=16 seconds~32 seconds. As an example, 24 seconds is suggested.

When Maximum drop rate, Y2=10%, Y3=0.5%, Tdetect, SyncRef UE_SL, X2=9.6 seconds~19.2 seconds. As an example, 14.4 seconds is suggested.

When Maximum drop rate, Y2=12%, Y3=0.6%, Tdetect, SyncRef UE_SL, X2=8 seconds~16 seconds. As an example, 12 seconds is suggested.

When Maximum drop rate, Y2=15%, Y3=0.75%, Tdetect, SyncRef UE_SL, X2=6.4 seconds~12.8 seconds. As an example, 9.6 seconds is suggested.

Maximum drop rate, when Y2=20%, Y3=1.0%, Tdetect, SyncRef UE_SL, X2=4.8 seconds~9.6 seconds. As an example, 7.2 seconds is suggested.

Maximum drop rate, when Y2=30%, Y3=1.5%, Tdetect, SyncRef UE_SL, X2=3.2 seconds~6.4 seconds. As an example, 4.8 seconds is suggested.

For reference, SL beam management may not be applied to a terminal supporting FR2 SL communication. In this case, a terminal supporting FR2 SL communication may operate in the same manner as described in Case 1. For example, for a terminal supporting FR2 SL communication, the terminal specifications supporting FR1 NR SL of Case 1, Case 1-1 and Case 1-2 may be applied.

Hereinafter, an operation of a terminal according to a second example of the disclosure of the present specification will be described with reference to FIG. 10.

The following drawings are made to explain a specific example of the present specification. Since the names of specific devices or names of specific signals/messages/fields described in the drawings are provided as examples, the technical features of the present specification are not limited to the specific names used in the drawings below.

FIG. 10 shows an example of an operation of a terminal according to a second example of the disclosure of the present specification.

In the case of a terminal supporting FR2 SL communication, an operation for selecting and/or reselecting an NS SL synchronization reference source may be performed according to the example of FIG. 10.

FIG. 10 shows an example of an operation of a terminal according to a second example of the disclosure of the present specification. The content shown in FIG. 10 is only an example, and the scope of the disclosure of the present specification is not limited by FIG. 10. The terminal is not limited by the example of FIG. 10 and may perform operations according to the second example of the present disclosure described through various examples above.

In step S1001, the terminal may determine whether the terminal supports SL beam management or whether the terminal performs SL beam management for SL communication. When the terminal supports SL beam management and/or performs SL beam management, the terminal may perform step S1002. If the terminal does not support SL beam management or does not perform SL beam management, the terminal may perform the same operation as described in the first example of the disclosure of the present specification. For example, in this case, the terminal may perform step S901 of FIG. 9.

In step S1002, the terminal may determine which synchronization reference source is set to the highest priority. For example, the synchronization reference source set to the highest priority may be a serving cell (PCell) or GNSS.

When the synchronization reference source set to the highest priority is the serving cell (PCell), the terminal may perform step S1006. When the synchronization reference source set to the highest priority is GNSS, the terminal may perform step S1003.

In step S1003, the terminal may determine what is the synchronization reference source to which the terminal is synchronized. For example, the synchronization reference source to which the UE is synchronized may be GNSS, a SyncRef UE synchronized directly or indirectly to GNSS, or other case (eg ii-1-c) in other case). Here, other case may include a case where the reference source with which the UE is synchronized is a SyncRef UE or a serving cell (PCell) that is not directly or indirectly synchronized with GNSS.

In step S1004, the terminal may detect an SL signal (e.g., SLSS) of another UE. In step S1004, the terminal may perform an operation according to "ii-1-a) when the UE is directly synchronized with the GNSS" described above. For example, the UE may not drop NR SLSS and NR SL data transmissions to select/reselect the synchronization reference source to SyncRef UE. In other words, the UE may not perform an operation of detecting a signal to select/reselect the synchronization reference source as the SyncRef UE.

In step S1005, the UE may detect an SL signal (e.g., SLSS) of another UE. In step S1005, the terminal may perform an operation according to "ii-1-b) when the UE is directly or indirectly synchronized with a SyncRef UE synchronized with GNSS" described above. For example, the UE should not drop NR SL data transmission to select/reselect the synchronization reference source to SyncRef UE. If the SyncRef UE meets the selection/reselection criteria defined in 3GPP TS 38.331 V16.1.0, the UE must be able to identify a newly detectable intra frequency SyncRef UE within the detection time (e.g., $T_{detect, \, SyncRef \, UE\_SL}$ seconds). For example, the UE may detect the SL signal (e.g., SLSS) of the SyncRef UE within the detection time. $T_{detect,SyncRef \, UE\_SL}$ can be defined as X1 seconds at SCH Es/Iot≥0 dB. The UE may drop up to Y1% of the UE's SLSS transmissions during $T_{detect,SyncRef \, UE\_SL}$ to select/reselect the synchronization reference source to SyncRef.

Here, X1 and Y1 may be set as described in various examples of "ii-1-b) when the UE is directly or indirectly synchronized with a SyncRef UE synchronized with GNSS".

As an example, $T_{detect,SyncRef \, UE\_SL}$ ($T_{detect,SyncRef \, UE\_SL}$ of FR2 SyncRef UE) X1=N×1.6 seconds for detecting a signal of FR2 SyncRef UE, and Y1=30%. Considering the number of beams operated by the FR2 SL terminal (e.g., operation of 4 to 8 beams) (N=4 to 8), $T_{detect,SyncRef \, UE\_SL}$= 6.4 seconds to 12.8 seconds. As an example, it may be $T_{detect,SyncRef \, UE\_SL}$=9.6 seconds.

Meanwhile, as described above, in the case of the FR2 SL terminal, M (M≥2) or more SLSSs may be basically set in the S-SSB.

For example, when one SLSS is set in the S-SSB as in the prior art, X1 and Y1 may be defined as in the following example. When the combination of X1 and Y1 is expressed as {X1, Y1}, it can be defined as in the following example. {X1, Y1}={6.4~12.8, 30}, {3.84~7.68, 50}, {3.2~6.4, 60}, {2.56~5.12, 75}, or {1.92~3.84, 100}.

As another example, when M (M≥2) or more LSSs are set in the S-SSB, X1 and Y1 may be defined as in the following example. When the combination of X1 and Y1 is expressed as {X1, Y1}, it can be defined as in the following example. {X1, Y1}={(6.4~12.8)/M, 30}, {(3.84~7.68)/M, 50}, {(3.2~6.4)/M, 60}, {(2.56~5.12)/M, 75}, or {(1.92~3.84)/M, 100}.

In step S1006, the terminal may detect an SL signal (e.g., SLSS) of another UE. In step S1006, the terminal may perform an operation according to "ii-1-c) in other case" or Case 2-2 described above. For example, the UE may drop NR SLSS and NR SL data transmissions to select/reselect the synchronization reference source to SyncRef UE. If the SyncRef UE meets the selection/reselection criteria defined in 3GPP TS 38.331 V16.1.0, the UE must be able to identify a newly detectable intra frequency SyncRef UE within the detection time (e.g., $T_{detect, \, SyncRef \, UE\_SL}$ seconds). For example, the UE may detect the SL signal (e.g., SLSS) of the SyncRef UE within the detection time. $T_{detect,SyncRef \, UE\_SL}$ may be defined as X2 seconds at SCH Es/Iot≥0 dB. To select/reselect the sync reference source to SyncRef, the UE may be allowed to drop up to Y2% of the UE's NR SL data transmission and NR SLSS transmission during $T_{detect,SyncRef \, UE\_SL}$. The UE can drop NR SL data reception per PSBCH monitoring occasion up to 2 slots. And, the overall drop rate must not exceed Y3% of NR SL data reception during $T_{detect,SyncRef \, UE\_SL}$ for selection/reselection of SyncRef UE.

Here, X2, Y2, and Y3 may be set as described above in "ii-1-c) in other cases" or various examples of Case 2-2.

As an example, $T_{detect,SyncRef \, UE\_SL}$ ($T_{detect,SyncRef \, UE\_SL}$ of FR2 SyncRef UE)X2=N×8 seconds for detecting the signal of FR2 SyncRef UE, and Y2=6% may be defined. Considering the number of beams operated by the FR2 SL terminal (e.g., operation of 4 to 8 beams) (N=4 to 8), $T_{detect,SyncRef \, UE\_SL}$=32 seconds to 64 seconds is proposed. For example, $T_{detect,SyncRef \, UE\_SL}$=48 seconds. And, Y3=0.3%.

Meanwhile, as described above, in the case of the FR2 SL terminal, M (M≥2) or more SLSSs may be basically set in the S-SSB.

For example, when one SLSS is configured in the S-SSB as in the prior art, X2, Y2, and Y3 may be defined as in the following example. If the combination of X2, Y2, and Y3 is expressed as {X2, Y2, Y3}, it can be defined as in the following example. {X2, Y2, Y3}={32~64, 6, 0.3}, {19.2~38.4, 10, 0.5}, {16~32, 12, 0.6}, {12.8~25.6, 15, 0.75}, {9.6~19.2, 20, 1.0}, or {6.4~12.8, 30, 1.5}.

As another example, when M (M≥2) or more SLSSs are set in the S-SSB, X2, Y2, and Y3 may be defined as in the following example. If the combination of X2, Y2, and Y3 is expressed as {X2, Y2, Y3}, it can be defined as in the following example. It may be {X2, Y2, Y3}={(32~64)/M, 6, 0.3}, {(19.2~38.4)/M, 10, 0.5}, {(16~32)/M, 12, 0.6}, {(12.8~25.6)/M, 15, 0.75}, {(9.6~19.2)/M, 20, 1.0}, or {(6.4~12.8)/M, 30, 1.5}.

Hereinafter, the operation of the terminal described through various examples in the disclosure of the present specification will be described with reference to FIG. 11.

The following drawings are made to explain a specific example of the present specification. Since the names of specific devices or names of specific signals/messages/fields described in the drawings are provided as examples, the technical features of the present specification are not limited to the specific names used in the drawings below.

Figure 11:
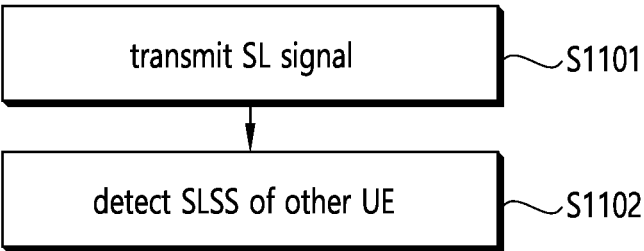
FIG. 11 shows an example of an operation of a terminal according to an embodiment of the disclosure of the present specification.

FIG. 11 shows an example of an operation of a terminal according to an embodiment of the disclosure of the present specification.

FIG. 11 shows an example of an operation of a terminal according to the disclosure of the present specification. The content shown in FIG. 11 is only an example, and the scope of the disclosure of the present specification is not limited by FIG. 11.

The terminal may perform operations according to various examples previously described in the disclosure of the present specification (e.g., the first example and the second example of the disclosure of the present specification).

In step S1101, the terminal may transmit an SL signal.

In step S1102, the UE may detect the SLSS of another UE. For example, the UE may detect other UEs based on SLSS transmitted from other UEs during a predefined detection time. During the predefined detection time, the SL signal may be allowed to drop up to a predefined maximum drop rate. A predefined maximum drop rate and a predefined detection time (e.g., $T_{detect, SyncRef UE\_SL}$ seconds) may be set based on various examples described in the first and second examples of the disclosure of the present specification. The predefined maximum drop rate and the predefined detection time, may be set based on the first synchronization reference source set to the highest priority and the second synchronization reference source with which the UE is synchronized. For example, the detection time (e.g., $T_{detect, SyncRef UE\_SL}$ seconds) and the maximum drop rate may be set based on Case 1-1 and Case 1-2 described in the first example of the disclosure of the present specification, and Case 2-1 and Case 2-2 described in the second example of the disclosure of the present specification.

According to the description in the disclosure of the present specification with reference to various examples, an operation for a UE supporting NR SL communication to select and/or reselect a synchronization reference source can be clearly defined. Accordingly, the NR UE can efficiently and/or clearly perform an operation for selecting and/or reselecting a synchronization reference source. According to what has been described in the disclosure of the present specification, SL communication can be efficiently performed. In addition, even when a terminal supporting FR2 SL communication performs a beam management operation, the terminal can efficiently perform SL communication.

For reference, the operation of the UE described in the present disclosure may be performed by the device shown in FIG. 1 to FIG. 3. For example, the UE may be the first wireless device 100 or the second wireless device 200 shown in FIG. 1. For example, the operation of the UE described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the UE described in the present disclosure by executing the instruction/program stored in the one or more memories 104 or 204.

Furthermore, the instructions for performing the operation of the UE described in the present disclosure may be stored in a non-volatile computer readable storage medium. The storage medium may be included in the one or more memories 104 or 204. In addition, the instructions stored in the storage medium may be executed by the one or more processors 102 or 202, and the operation of the UE described in the present disclosure may be performed.

For reference, the operation of the BS (e.g., NG-RAN, gNB, gNB (NB-IoT), gNB (NR) eNB, RAN, etc.) described in the present disclosure may be implemented by the device shown in FIG. 1 to FIG. 3. For example, the BS (e.g., NG-RAN, gNB, gNB (NB-IoT), gNB (NR) eNB, RAN, etc.) may be the first wireless device 100a or the second wireless device 100b shown in FIG. 1. For example, the operation of the BS (e.g., NG-RAN, gNB, gNB (NB-IoT), gNB (NR) eNB, RAN, etc.) described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the BS (e.g., NG-RAN, gNB, gNB (NB-IoT), gNB (NR) eNB, RAN, etc.) described in the present disclosure by executing the instruction/program stored in the one or more memories 104 or 204.

Furthermore, the instructions for performing the operation of the BS (e.g., NG-RAN, gNB, gNB (NB-IoT), gNB (NR) eNB, RAN, etc.) described in the present disclosure may be stored in a non-volatile (or non-transitory) computer readable storage medium. The storage medium may be included in the one or more memories 104 or 204. In addition, the instructions stored in the storage medium may be executed by the one or more processors 102 or 202, and the operation of the BS (e.g., NG-RAN, gNB, gNB (NB-IoT), gNB (NR) eNB, RAN, etc.) described in the present disclosure may be performed.

So far, the preferred embodiment has been described in an exemplary manner. However, the disclosure of the present specification is not limited to the specific embodiment and may be modified, altered, or improved in various forms within the inventive concept and the scope written in the claims of the present disclosure.

In the exemplary system described above, the methods are described based on a flowchart as a series of steps or blocks. However, the methods are not limited to the order of the steps described above, and a certain step may be performed in a different order or performed simultaneously. Furthermore, it is understood that the steps shown in the flowchart are not mutually exclusive, but another step may be included, or one or more steps may be deleted without influencing the scope to those ordinary skilled in the art.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

transmitting, by a user equipment (UE), a first synchronization signal; and based on i) a global navigation satellite system (GNSS) synchronization reference source being configured as the highest priority, and ii) the UE being synchronized to a first synchronization reference UE that is synchronized to a GNSS, identifying, by the UE, a second synchronization reference UE within a detection time, wherein the UE is allowed to drop a maximum drop rate of transmission of the first synchronization signal during the detection time, wherein, based on the UE supporting i) frequency range 2 (FR 2) new radio (NR) sidelink communication and ii) a sidelink beam management, the detection time is defined based on the maximum drop rate and the number of reception beams related to a second synchronization signal received from the second synchronization reference UE, wherein the number of reception beams is represented by N, which is a positive integer, and wherein the detection time is N*1.6 seconds*30/(the maximum drop rate) based on the maximum drop rate being greater than 30%.

2. A User Equipment (UE) comprising:

at least one processor; and at least one memory operably electrically connectable to the at least one processor and storing instructions, based on being executed by the at least one processor, cause the UE to perform operations comprising:

transmitting a first synchronization signal; and based on i) a global navigation satellite system (GNSS) synchronization reference source being configured as the highest priority, and ii) the UE being synchronized to a first synchronization reference UE that is synchronized to a GNSS, identifying a second synchronization reference UE within a detection time, wherein the UE is allowed to drop a maximum drop rate of transmission of the first synchronization signal during the detection time, wherein, based on the UE supporting i) frequency range 2 (FR 2) new radio (NR) sidelink communication and ii) a sidelink beam management, the detection time defined is based on the maximum drop rate and the number of reception beams related to a second synchronization signal received from the second synchronization reference UE, wherein the number of reception beams is represented by N, which is a positive integer, and wherein the detection time is N*1.6 seconds*30/(the maximum drop rate) based on the maximum drop rate being greater than 30%.

3. The UE of claim 2, wherein the UE is an autonomous driving device that communicates with at least one of a mobile terminal, a network, and an autonomous vehicle other than the UE.

* * * * *